United States Patent [19]

Varghese et al.

[11] Patent Number: 4,877,153

[45] Date of Patent: Oct. 31, 1989

[54] METHOD AND APPARATUS FOR STORING CRYOGENIC FLUIDS

[75] Inventors: Alexander P. Varghese, Bethlehem; Robert H. Herring, New Tripoli, both of Pa.

[73] Assignee: Air Products and Chemicals, Inc., Allentown, Pa.

[21] Appl. No.: 152,278

[22] Filed: Feb. 4, 1988

[51] Int. Cl.$^4$ .............................................. B65D 90/04
[52] U.S. Cl. .................................. 220/469; 220/426; 220/446
[58] Field of Search ............... 220/426, 420, 421, 422, 220/423, 424, 445, 446, 450, 901; 62/45, 50, 51, 54, 55, 60

[56] References Cited

U.S. PATENT DOCUMENTS

| | | |
|---|---|---|
| 2,314,598 | 3/1943 | Phelan .................................. 220/469 |
| 3,780,900 | 12/1973 | Yamamoto .......................... 220/426 |
| 3,782,128 | 1/1974 | Hampton et al. ................... 220/426 |
| 3,895,497 | 7/1975 | McIntosh et al. .................. 220/426 |
| 3,952,531 | 4/1976 | Turner ................................. 220/426 |
| 4,154,363 | 5/1979 | Barthel ............................... 220/421 |
| 4,548,335 | 10/1985 | Remes et al. ........................ 220/446 |
| 4,674,289 | 6/1987 | Andonian ............................ 220/446 |

Primary Examiner—Willis Little
Attorney, Agent, or Firm—James C. Simmons; William F. Marsh

[57] ABSTRACT

Method and apparatus for preventing loss of liquid cryogen due to heat infiltration into the cryogen stored in a dewar. At least one transient heat shield disposed in the vacuum space between the inner and outer vessels of the dewar in heat exchange with normal vapor withdrawal means of the stored cryogen intercepts heat transfer into the stored cryogen.

12 Claims, 2 Drawing Sheets

METHOD AND APPARATUS FOR STORING CRYOGENIC FLUIDS

BACKGROUND OF THE INVENTION

This invention pertains to cryogenic storage dewars, tanks or containers of the vacuum-jacketed type suitable for storing cryogenic fluids such as liquid hydrogen at a user location subject to withdrawal of the liquid cryogen according to the need of the user.

Transportation, storage and/or distribution of industrial gases such as oxygen, nitrogen, helium, hydrogen, argon, neon and the like with atmospheric pressure condensation temperatures in the cryogenic range, e.g. below $-130°$ F. ($-90°$ C.) becomes most economical when the gases are maintained in the liquid phase. In the ordinary course of liquefying the gases, large quantities of refrigeration are necessary. When the liquid is brought to a user's location and placed in a cryogenic storage dewar, the liquid is generally converted to a gas for use by the customer thus releasing refrigeration. Conventional storage dewars dump the refrigeration produced by vaporation of the stored cryogen to the atmosphere.

In the case of long term storage of cryogen on a customer site there is the possibility, if the withdrawal rate is not very large, that due to infiltration of heat, stored cryogen will be vaporized inside the dewar and the vapor vented to the atmosphere, thus causing loss of cryogen available for use by the user (customer). For example, when liquid hydrogen is stored in a conventional 1500 gallon cryogenic dewar comprising an inner vessel and an outer vessel with a vacuum space between the inner and outer vessel and the vacuum space containing a conventional multi-layer insulation, in order to prevent loss of stored cryogen by venting the user must draw off a minimum of approximatedly 80,000 ft$^3$ per month of vapor in order to utilize all of the delivered cryogen.

One approach to maintaining liquid inventory and prevent venting of vaporized cryogen inside the tank is disclosed and claimed in U.S. Pat. No. 3,698,200. Patentees' invention relies upon a heavy radiation shield disposed between the inner and outer vessel which is cooled by the product as the inner vessel is filled. This technique is used in combination with the conventional multi-layer insulation, vacuum jacketing, and a liquid nitrogen reservoir inside the tank and is particularly adapted for storage of liquefied helium which vaporizes at approximately 4° K.

Precooling of the radiation shield according to Patentees is accomplished by allowing a portion of the fluid stored inside the tank to vent during filling to thus precool the radiation shield.

SUMMARY OF THE INVENTION

In order to achieve a cryogenic dewar that will result in no loss or minimum loss of product during storage at a user location, it has been discovered that a transient heat shield should be disposed between the inner and outer vessels in the vacuum space of the dewar. Furthermore, the transient heat shield should be constructed so that it can be put in heat exchange with the vaporized cryogen which is normally drawn off the top of the vessel so that as product is withdrawn, it cools the transient heat shield to prevent influx of heat into the inner vessel of the dewar. When the transient heat shield includes a heat sink that is in heat exchange relationship with the withdrawal conduit, refrigeration of the transient heat shield is more adequately facilitated and a better product loss prevention device is effected. Alternatively, a fluid heat sink can be used in combination with the transient heat shield to achieve the same effect.

DESCRIPTION OF THE PREFERRED EMBODIMENT

Figure 1:
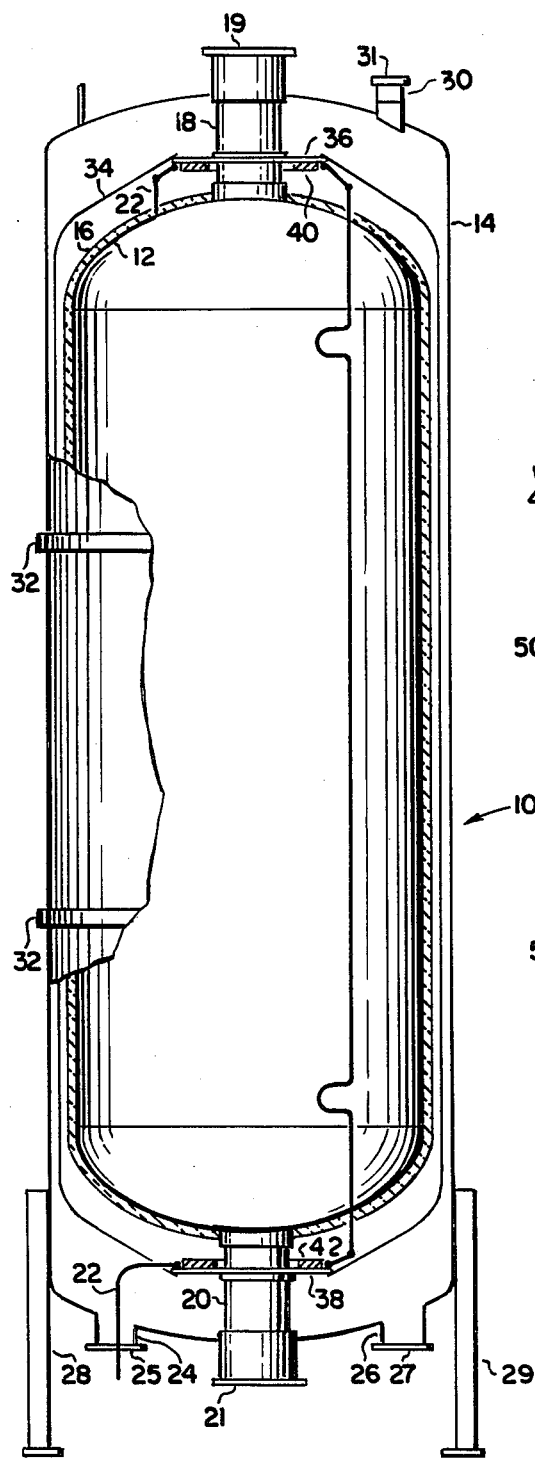
FIG. 1 is a schematic representation of a cryogenic storage dewar according to the present invention.

Referring to FIG. 1, there is shown a dewar 10 for storing cryogenic fluid of the type to which the instant invention is applicable. Such cryogenic storage dewars or customer stations 10 as they are known in the trade are used for holding a cryogenic fluid, e.g. nitrogen, oxygen, hydrogen, argon, helium or the like, in liquid form for use by a user or customer in their everyday operations. A number of such storage devices are provided so that customers can withdraw either liquid or cold vaporized cryogen from the tank.

The conventional dewar shown as 10 includes an inner tank 12 and an outer tank 14, the inner tank being covered by a suitable insulation such as a multi-layer composite of metal and plastic and supported in the outer shell 14 by means of tubes or trunions 18 and 20 closed by suitable vacuum tight covers 19 and 21, respectively. Inner tank 12 includes a fluid conduit 22 which passes outwardly of the outer tank 14 to deliver cryogen vaporized inside the inner vessel to the point of use. In the event the customer wishes to withdraw liquid, a suitable withdrawal device is placed at the bottom of the tank (not shown) as is well known in the art.

Outer tank 14 includes lower passages 24 and 26 closed by suitable covers 25 and 27 to permit conduits and instrumentation to be passed inside the outer vessel 14 to the inner vessel 12. Outer vessel 14 includes a suitable relief conduit 30 and a relief valve 31 associated therewith. The storage dewars or tanks of this type generally provide for evacuation of the space between the inner tank 12 and the outer tank 14 to thus provide additional insulation and slow down heat infiltration from the atmosphere to the inner tank 12. Outer tank 14 can include a plurality of supports shown generally as 28 so that the vessel can be installed in a vertical position, thus providing for vaporized cryogen to accumulate near the top of the inner vessel 12. Dewar 10 can also be constructed for horizontal installation as is well known in the art.

Figure 2:
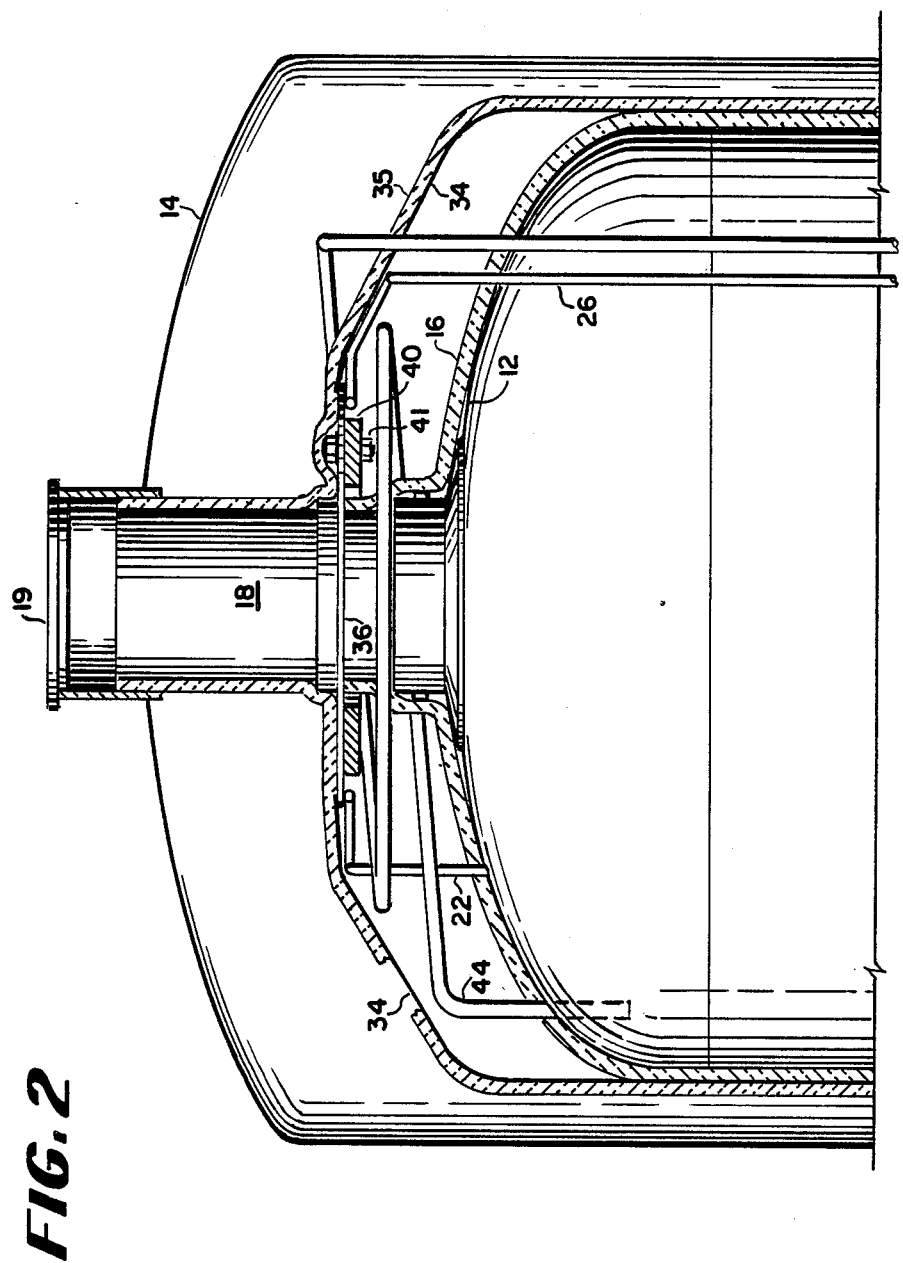
FIG. 2 is an enlarged representation of the top portion of a cryogenic storage dewar according to the present invention.

According to the present invention at least one transient heat shield 34 which is fabricated from a suitable conductive material such as aluminum is disposed in the vacuum space between the inner vessel 12 and the outer vessel 14. Heat shield 34 is attached to a pair of low heat conductive (e.g. fiberglass) supports 36 and 38 which are in turn fastened to the inner vessel supports 18 and 20, respectively. As shown in FIG. 2 heat shield 34 preferably is covered by a layer of conventional multi-layer insulation. Disposed on supports 36 and 38 are a pair of heat sinks 40 and 42 which are fabricated from a metal having a high specific heat and high thermal conductivity and of greater mass than the transient heat shield 34. Heat sinks 40, 42 can be fabricated from individual segments or cast as a solid piece depending upon the type of dewar being fabricated. The vapor withdrawal conduit 22 communicating with the interior of inner vessel 12 is fixed in heat exchange relationship with the heat sinks 40 and 42, respectively, and the heat shield 34 prior to exiting outer vessel 14 through passage 24.

Referring to FIG. 2, the transient heat shield 34 can have disposed on its outer surface insulation 35 of the same type used to insulate the inner vessel 12 and shown as 16. As shown in FIG. 2, heat sink 40 can be fastened to support 36 as by bolting shown generally as 41.

Additional conduit 44 leading to the normal safety relief device (not shown) is fixed in heat exchange relationship with the heat sinks 40, 42 to derive additional refrigeration, in case fluid flow occurs through this conduit because of overpressurization of inner vessel 12.

The tank according to FIGS. 1 and 2 utilizes the refrigeration capacity of the vaporized gas to intercept heat leak into the container to thus prolong the storage time of the liquid cryogen and reduce losses due to vapors passing into the atmosphere through the normal relief valve system (not shown). The cryogenic liquid or cold gas drawn out of the tank to be warmed up and used by the customer will provide refrigeration to the transient heat shield 34. The refrigeration is stored in the transient heat shield 34 and the heat sinks 40 and 42 to intercept heat leaking into the container when cold fluid flow through the withdrawal conduit 22 has been terminated. In intercepting heat leak into the container, thermal energy level of the transient shield 34 will increase thus depleting the stored refrigeration capacity of the transient heat shield 34. When cold gas is withdrawn at a subsequent time, the flow of cold gas will again lower the thermal energy level of the transient shield 34 and thus refrigeration will be accumulated in the shield and the heat sinks (34, 40 and 42). Interception of the heat leak by the transient shield when the fluid flow is absent reduces the net heat transfer into the cryogen container and thus prolongs storage time and saves energy.

For example, in a conventional dewar or storage tank such as shown in FIG. 1, without the transient heat shield 34 used to store 1500 gallons of liquid hydrogen unless the user withdraws approximately 80,000 ft$^3$ per month from the vapor space in the vessel, the tank will, after reaching the set relief pressure due to warming of the stored cryogen, continuously vent through its normal venting system 44 and thus product will be lost. Taking this tank and installing a transient heat shield according to the present invention gives the customer the option of withdrawing only approximately 25,000 ft$^3$ per month of vapor in an intermittent pattern over the month without loss of vapor through the normal venting apparatus. Thus while in both instances the user can vary his demand over the month, the necessary demand in order to prevent loss of any stored product is reduced from approximately 80,000 ft$^3$ a month to approximately 25,000 ft$^3$ a month, thus giving the user more flexibility in his product usage. A particularly effective transient heat shield according to the present invention can be fabricated from aluminum having a thickness less than 0.125". The heat sinks 40, 42 should each have a total weight of approximately 150 pounds in order to provide additional storage capacity of the refrigeration obtained from the withdrawn vapor.

The solid heat sinks 40 and 42 extract and store refrigeration from the exiting cryogenic fluid through heat transfer and by lowering of their enthalpy. When the cryogen flow stops, temperature of the transient heat shield 34 will rise due to the heat leaking into the tank or dewar 10. The solid heat sinks 40 and 42 will absorb a major part of this heat leak through the release of stored refrigeration themselves and to the heat shield 34, thus reducing the net heat leak into the stored cryogen. Different materials can be used for the transient heat shield and solid heat sinks in order to optimize performance of the transient heat shield system. The solid heat sinks 40 and 42 can be positioned at appropriate locations to optimize the design and operation of the tank 10 and can result in utilization of thin shielding to provide the optimum refrigeration transfer. Since the solid heat sink material can be positioned at various locations, it can be more efficiently cooled by the vaporized cryogen, particularly when vaporized cryogen is drawn off at a high rate for only a short period of time. Thermal gradients between the cold gas and most remote parts of the solid heat sink can be minimized, thus improving the extraction and storage of refrigeration.

It is also possible to utilize more than one transient heat shield and heat sink combination to intercept more heat leak into the dewar 10.

Figure 3:
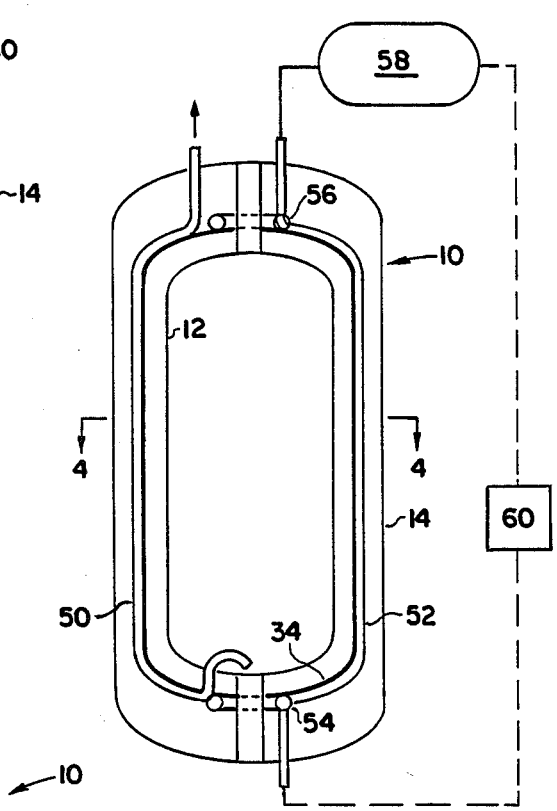
FIG. 3 is a schematic representation of an alternate embodiment of the present invention.
Figure 4:
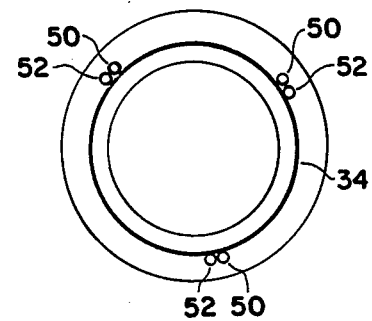
FIG. 4 is a section taken along lines 4—4 of FIG. 3.

Referring to FIGS. 3 and 4, there is shown a schematic representation of the tank 10 containing the inner vessel 12 and the outer vessel 14 to which is applied a fluid heat sink system. The fluid heat sink system is particularly adapted to the transient heat shield 34 where solid heat sinks would of necessity be too large for proper placement and support or where it is impractical or inconvenient to store the required refrigeration in transient heat shields with solid heat sinks.

The fluid heat sink consists of the withdrawal conduit 50 as it exits the tank being manifolded to provide a plurality of conduits which can be disposed around the transient heat shield 34 disposed in heat exchange relationship with transient heat shield 34 and an equal number of fluid heat sink conduits 52 which are connected to inlet manifolds 54 and outlet manifolds 56, respectively. The fluid heat sink manifolds 54 and 56 are used to provide a continuous fluid heat sink circulation path such as shown in the drawing and includes a reservoir 58 and, if necessary, a circulating device 60. The fluid heat sink system utilizes a reusable fluid, the particular fluid selected determined by the cryogen being stored in the dewar 10 and the operating limits of the temperature of the transient heat shield. For example, when the dewar 10 is used to store liquid hydrogen the fluid sink fluid can be nitrogen. While FIG. 3 shows the use of a circulating device 60, the system can be designed so that no additional energy via the use of a circulating device is necessary.

In operation, the system of FIGS. 3 and 4 extracts refrigeration from the cryogen exiting the dewar 10 through conduits 50. The refrigeration is stored in the fluid heat sink (52, 54, 56). By selecting appropriate fluids with high specific heats or high latent heats, considerable refrigeration may be stored and released when there is no cryogen flow out of the storage tank and the transient shield starts to warm up. The fluid sink fluid may be stored in a reservoir 58 inside or outside the vacuum jacket of the dewar 10 depending upon its temperature of operation. If a liquid is used as the fluid heat sink fluid, it may be cooled and frozen. In cases where compressed gas is being used as the fluid heat sink fluid, it may be stored outside or inside the vacuum jacket depending upon its enthalpy level. Compressed gases may be cooled, condensed or frozen. In all cases where freezing is involved, sufficient consideration must be given during the design stage to behavior of fluid properties during freezing and thermal performance of the transient shield. In cases where the physical size of the transient shield system necessitate external means for circulating the fluid heat sink fluid, pumps or compressors may be used.

Having thus described our invention what is desired to be secured by Letters Patent in the United States is set forth in the appended claims.

I claim:

1. In a dewar for storing or transporting cryogenic fluid of the type containing an outer vessel and an inner vessel disposed therein, said inner vessel including means to admit and withdraw cryogenic fluid from the interior thereof, and insulation between said inner and outer vessels, the improvement comprising:

disposing at least one metallic transient heat shield between said inner and outer vessels, said heat shield containing means to retain refrigeration, said means to retain refrigeration adapted to be contacted by cold vaporized cryogen as it is withdrawn from said inner vessel, said means to retain refrigeration also includes a heat sink in heat exchange with said vapor withdrawal means.

2. A dewar according to claim 1 wherein said means to retain refrigeration includes a solid heat sink in heat exchange with said vapor withdrawal means.

3. A dewar according to claim 2 wherein said solid heat sink is a metal having high specific heat and high thermal conductivity.

4. A dewar according to claim 3 wherein said metal is aluminum.

5. A dewar according to claim 1 wherein said metallic transient heat shield is in direct heat exchange with a fluid heat sink.

6. A dewar according to claim 5 wherein said fluid heat sink includes a plurality of conduits in heat exchange with said transient heat shield and vaporized stored cryogen withdrawal means, said conduits include means for circulating a heat extracting fluid through said conduits.

7. A dewar according to claim 6 wherein said heat extracting fluid is selected from the group of fluids having high specific heat or high latent heat.

8. A dewar according to claim 7 wherein said heat extractig fluid is selected from the group consisting of helium, hydrogen, nitrogen, argon, oxygen, neon and mixtures thereof.

9. A dewar according to claim 7 wherein there is a vacuum space between said inner and outer vessels and said heat extracting fluid is stored in said vacuum space.

10. A method for preventing loss of cryogen stored in a vacuum jacketed dewar due to infrequent withdrawal causing the stored cryogen to warm and vaporize due to heat infiltration into said dewar comprising the steps of:

disposing at least one metallic transient heat shield in said vacuum jacket containing means to retain refrigeration produced by said refrigeration retaining means being disposed in heat exchange relationship with vaporized cryogen as it is withdrawn from said dewar for use.

11. A method according to claim 10 wherein solid heat sinks are disposed in heat exchange with said transient heat shield and vaporized cryogen withdrawal means.

12. A method according to claim 10 wherein a fluid heat sink is disposed heat exchange with said transient heat shield.

* * * * *